United States Patent
Marothiya et al.

(10) Patent No.: US 11,107,037 B2
(45) Date of Patent: Aug. 31, 2021

(54) METHOD AND SYSTEM OF SHARING PRODUCT DATA IN A COLLABORATIVE ENVIRONMENT

(71) Applicants: Pankaj Marothiya, Pune (IN); Ravi Rajagopal, Troy, MI (US)

(72) Inventors: Pankaj Marothiya, Pune (IN); Ravi Rajagopal, Troy, MI (US)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 356 days.

(21) Appl. No.: 16/213,008

(22) Filed: Dec. 7, 2018

(65) Prior Publication Data
US 2019/0188643 A1    Jun. 20, 2019

(30) Foreign Application Priority Data
Dec. 15, 2017    (IN) .............................. 201731045105

(51) Int. Cl.
*H04L 29/06* (2006.01)
*G06Q 10/10* (2012.01)
*G06F 16/172* (2019.01)

(52) U.S. Cl.
CPC ......... *G06Q 10/101* (2013.01); *G06F 16/172* (2019.01); *H04L 65/1069* (2013.01); *H04L 65/403* (2013.01); *H04L 65/601* (2013.01)

(58) Field of Classification Search
CPC . G06Q 10/101; G06F 16/172; H04L 65/1069; H04L 65/403; H04L 41/5003; H04L 67/02; H04L 65/80; H04L 65/601; H04L 47/25; H04N 21/23805

USPC ........................................................ 705/300
See application file for complete search history.

(56) References Cited

U.S. PATENT DOCUMENTS

| | | | |
|---|---|---|---|
| 8,341,285 B2 | 12/2012 | Eshwar et al. | |
| 9,244,737 B2 | 1/2016 | Kawano et al. | |
| 9,479,807 B1* | 10/2016 | Bugajski | H04N 21/84 |
| 2007/0043874 A1 | 2/2007 | Nath | |
| 2008/0276184 A1* | 11/2008 | Buffet | G06F 30/00 |
| | | | 715/752 |
| 2015/0067811 A1 | 3/2015 | Agnew | |
| 2015/0146778 A1* | 5/2015 | De Cicco | H04N 21/8456 |
| | | | 375/240.07 |

(Continued)

OTHER PUBLICATIONS

European Search Report for European Patent Application No. 18212423.0-1217 dated Apr. 1, 2019.
(Continued)

*Primary Examiner* — Glenford J Madamba
(74) *Attorney, Agent, or Firm* — Lempia Summerfield Katz LLC (57) ABSTRACT

A method and system for sharing product data in a collaborative environment is disclosed. In one embodiment, the method includes establishing a session for sharing product data between a source device and a target device. The method includes adaptively generating one or more payload files corresponding to the product data based on payload processing information. The payload processing information includes number of payload files waiting to be processed at the target device. Moreover, the method includes sending the one or more payload files to the target device over the product data sharing session such that the product data is reproduced at the target device using the payload files.

17 Claims, 8 Drawing Sheets

(56) References Cited

U.S. PATENT DOCUMENTS

2016/0112732 A1* 4/2016 Li ..................... H04N 21/2662
725/116
2016/0234078 A1* 8/2016 Jana ....................... H04L 47/25

OTHER PUBLICATIONS

European Office Action for European Application No. 18212423.0 dated Jun. 15, 2020.

* cited by examiner

METHOD AND SYSTEM OF SHARING PRODUCT DATA IN A COLLABORATIVE ENVIRONMENT

The application claims the benefit of Indian Patent Application No. IN 201731045105, filed Dec. 15, 2017, which is hereby incorporated by reference in its entirety.

FIELD OF TECHNOLOGY

The present disclosure relates to the field of product lifecycle management system, and more particularly to a method and system for sharing product data in a collaborative environment.

BACKGROUND

In a collaborative environment such as a collaborative product design and development environment, designers may be located at different geographical locations and yet simultaneously contribute to the product design using product lifecycle management software. During the product design process, a large amount of product data is required to be shared across the different geographical locations over the Internet. However, transferring the large amount of product data across geographically distributed locations may be a time consuming task. This becomes even more challenging when the designers at transmission side and/or reception side have insufficient network bandwidth, leading to inability to timely share or have access to the product data. This may result in inefficient design and development of a product in a geographically distributed collaborative environment.

One of the known methods involves sequentially exporting of product data from a source location, dispersing the exported product data across the wide area network to one or more target locations, and importing the product data to respective target location. However, the above technique is time consuming and may result in delay in the entire product design and development. Another currently known method involves initiating individual data transfers across geographically distributed locations in parallel by dividing structured product data associated with each individual data transfers into a plurality of subsets. This is achieved by analyzing the structured product data to be shared and recursively dividing the structured product data into bounded-size subsets that are then shared in parallel. However, the above-mentioned method adopts sequential operations such as analyzing the product data, traversing through the product data, and exporting subsets of the product data from a source location, and importing the subsets of product data to a target location. However, the above mentioned method may have few limitations such as inefficient use of resources at the source location and the target location. For example, computing resources (e.g., processors, memory, etc.) at the target location remain unutilized while the subsets are being exported from the source location. Similarly, computing resources (e.g., processors, memory, etc.) at the source location remain unutilized while the subsets are being imported and processed at the target location. This may cause delay in exporting and importing of product data that is waiting to be shared.

SUMMARY

The scope of the present disclosure is defined solely by the appended claims and is not affected to any degree by the statements within this description. The present embodiments may obviate one or more of the drawbacks or limitations in the related art.

A method and system for sharing product data in a collaborative environment is disclosed. In one aspect, a method of sharing product data in a collaborative environment includes establishing a session for sharing product data between a source device and a target device. The source device includes a plurality of exporter processes and the target device includes a plurality of importer processes. The exporter processes process the collected product data in coordination with each other. The method includes adaptively generating one or more payload files corresponding to the product data in abased on payload processing information. The payload processing information includes number of payload files waiting to be processed at the target device. Furthermore, the method includes sending the one or more payload files to the target device over the product data sharing session so that the product data is reproduced at the target device using the payload files. The method may include periodically obtaining the payload processing information from the target device during the product data sharing session.

The method may include collecting the respective product data to be transferred by each of the exporter processes. The method may include determining whether size of the collected product data is greater than a minimum threshold size and less than a maximum threshold size. If the size of the collected product data is greater than the minimum threshold size and less than the maximum threshold size, then the method may include computing a payload ratio of the number of payload files waiting to be processed to the number of importer processes employed at the target device. Furthermore, the method may include determining whether the payload ratio is less than a threshold payload ratio. The threshold payload ratio is a maximum number of payload files allowed to wait at the target device to the number of importer processes employed at the target device. If the payload ratio is less than the threshold payload ratio, then the method may include generating the one or more payload files based on the difference between the payload ratio and the threshold payload ratio. If the payload ratio is equal to or greater than the threshold payload size, the method may include deferring act of dynamic generation of payload files based on the collected product data. Moreover, the method may include periodically repeating the above acts until sharing of the product data is complete.

The method may include computing difference between the payload ratio and the threshold payload ratio. The method may include determining a number of payload files that may be sent to the target device based on the difference between the payload ratio and the threshold payload ratio. Furthermore, the method may include determining size of the collected product data needs to be sent to the target device. Moreover, the method may include determining size of each payload file to be created based on the number of payload files and the size of the collected product data. The determined size of the payload files is within a minimum permissible payload size and a maximum permissible payload size. The method may include generating the payload files from the collected product data according to the determined size of each payload file.

In another aspect, a data processing system includes at least one processing unit (e.g., processor) employing a plurality of exporter processes, and a memory unit (e.g., memory) coupled to the processing unit. The memory unit includes a data sharing module stored in the form of machine-readable instructions and executable by the processing unit. The data sharing module is configured to establish a session for sharing product data with a target device. The data sharing module is also configured to adaptively generate one or more payload files corresponding to the product data based on payload processing information. The payload processing information includes number of payload files waiting to be processed at the target device in the product data sharing session. Additionally, the data sharing module is configured to send the one or more payload files to the target device over the product data sharing session so that the product data is reproduced at the target device using the one or more payload files. It may be noted that, the exporter processes process the collected product data in coordination with each other.

The data sharing module may be configured to periodically obtain the payload processing information from the target device during the product data sharing session. The data sharing module is configured to collect the respective product data to be transferred by each of the exporter processes. The data sharing module may be configured to determine whether size of the collected product data is greater than a minimum threshold size and less than a maximum threshold size. If the size of the collected product data is greater than the minimum threshold size and less than the maximum threshold size, then the data sharing module may be configured to compute a payload ratio of the number of payload files waiting to be processed to the number of importer processes employed at the target device. Then, the data sharing module may be configured to determine whether the payload ratio is less than a threshold payload ratio. The threshold payload ratio is a maximum number of payload files allowed to wait at the target device to the number of importer processes employed at the target device. If the payload ratio is less than the threshold payload ratio, the data sharing module may be configured to generate the one or more payload files based on the difference between the payload ratio and the threshold payload ratio. If the payload ratio is less than the threshold payload ratio, then the data sharing module may be configured to defer the act of generation of payload files based on the collected product data. Moreover, the data sharing module may be configured to periodically repeat the above acts until the sharing of the product data is complete.

Furthermore, the data sharing module may configured to compute difference between the payload ratio and the threshold payload ratio, and determine a number of payload files that may be sent to the target device based on the difference between the payload ratio and the threshold payload ratio. The data sharing module is configured to determine size of the collected product data that needs to be sent to the target device, and determine size of each payload file to be created based on the number of payload files and the size of the collected product data. For example, the determined size of the payload files is within a minimum permissible payload size and a maximum permissible payload size. Accordingly, the data sharing module is configured to generate the payload files from the collected product data according to the determined size of each payload file.

In yet another aspect, a non-transitory computer-readable storage medium having instructions stored therein, that when executed by a data processing system, cause the data processing system to perform a method of managing sharing product data in a collaborative environment. The method includes establishing a session for sharing product data with a target device, and adaptively generating one or more payload files corresponding to the product data based on payload processing information. The payload processing information includes number of payload files waiting to be processed at the target device in the product data sharing session. Also, the method includes sending the one or more payload files to the target device over the product data sharing session, wherein the product data is reproduced at the target device using the one or more payload files.

The method may include collecting the respective product data to be transferred by each of the exporter processes, and determining whether size of the collected product data is greater than a minimum threshold size and less than a maximum threshold size. If the size of the collected product data is greater than the minimum threshold size and less than the maximum threshold size, then the method may include computing a payload ratio of the number of payload files waiting to be processed to the number of importer processes employed at the target device. The method may include determining whether the payload ratio is less than a threshold payload ratio. The threshold payload ratio is a maximum number of payload files allowed to wait at the target device to the number of importer processes employed at the target device. If the payload ratio is less than the threshold payload ratio, the method may include generating the one or more payload files based on the difference between the payload ratio and the threshold payload ratio. If the payload ratio is less than the threshold payload ratio, deferring the act of generation of payload files based on the collected product data. Moreover, the method may include periodically repeating the above acts until the sharing of the product data is complete.

The method may include computing difference between the payload ratio and the threshold payload ratio, and determining a number of payload files that may be sent to the target device based on the difference between the payload ratio and the threshold payload ratio. Furthermore, the method may include determining size of the collected product data that needs to be sent to the target device, and determining size of each payload file to be created based on the number of payload files and the size of the collected product data. The determined size of the payload files is within a minimum permissible payload size and a maximum permissible payload size. Moreover, the method may include generating the payload files from the collected product data according to the determined size of each payload file.

This summary is provided to introduce a selection of concepts in a simplified form that are further described below in the following description. It is not intended to identify features or essential features of the claimed subject matter. Furthermore, the claimed subject matter is not limited to implementations that solve any or all disadvantages noted in any part of this disclosure.

DETAILED DESCRIPTION

A method and system for sharing product data in a collaborative environment is disclosed. Various embodiments are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the spirit and scope of the present disclosure.

Figure 1:
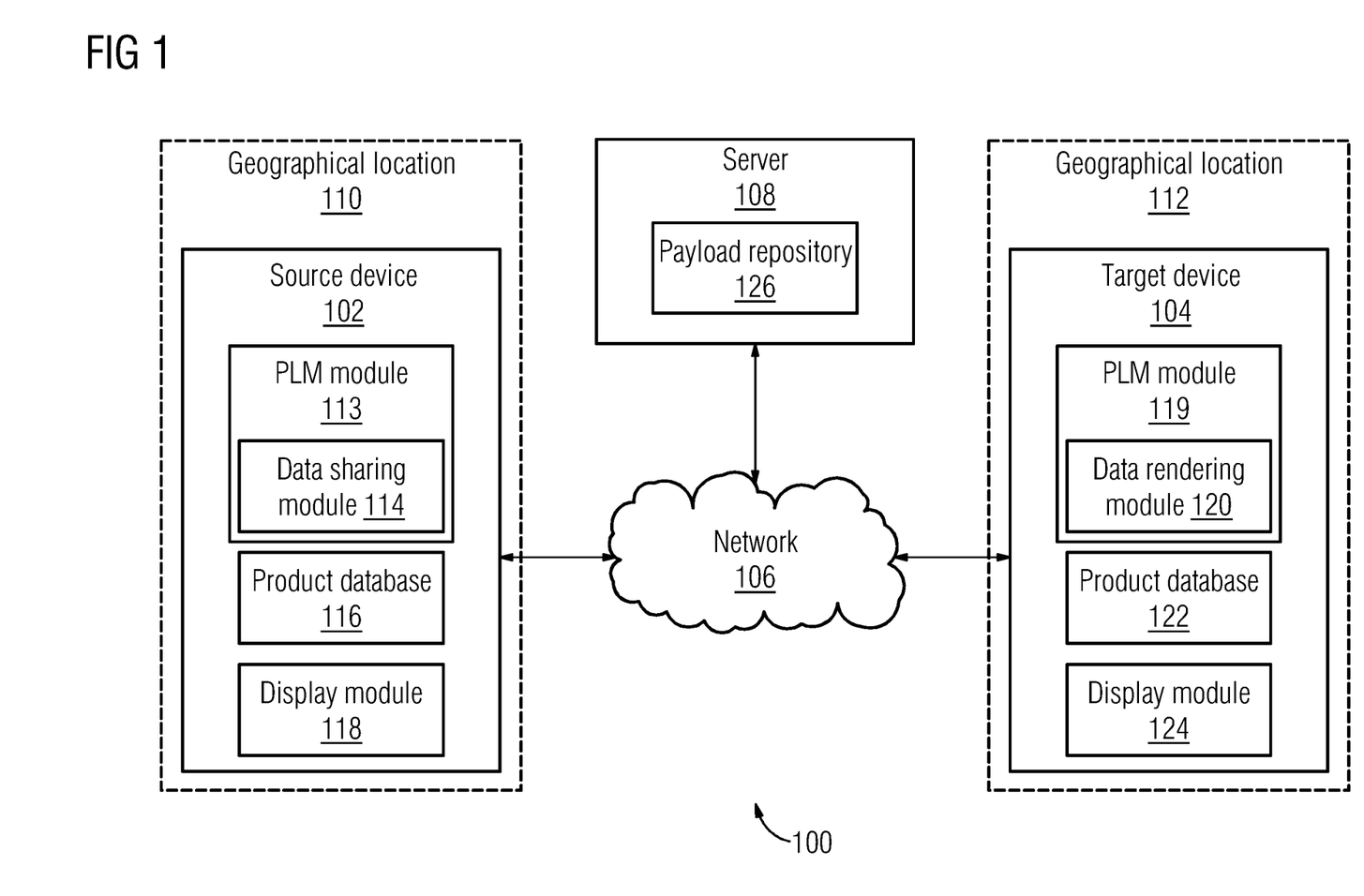
FIG. 1 is a schematic representation of a collaborative environment for developing a product, according to one embodiment.

FIG. 1 is a schematic representation of a collaborative environment 100 for developing a product, according to one embodiment. The collaborative environment 100 enables multiple designers distributed across various geographical locations to develop a product using Product Lifecycle Management software installed on respective devices. The product may be a component such as a shaft or assembly of components such as a car. When the product is being designed and developed, a designer may wish to share product data associated with the product with one or more designers from time to time to facilitate collaborative development of the product. For example, the product data may be a representation of the product such as a geometric model, bill of materials associated with the product, simulation data associated with the product, etc. According to present disclosure, the collaborative environment 100 enables designers to efficiently share the product data with each other as described in detail below.

The collaborative environment 100 includes a source device 102, a target device 104, and a server 108. The source device 102, the target device 104, and the server 108 are connected to each other via a network 106 such as wide area network. In one embodiment, the source device 102 is located at a geographical location 110 and the target device 104 is located at a geographical location 112. The target device 104 may be located at the geographical location 110 where the source device 102 is located. It is also possible that there may be multiple target devices connected to the source device 102 in the collaborative environment 100.

The source device 102 and the target device 104 may include a desktop computer, a laptop computer, a tablet computer, a smart phone and the like devices. The source device 102 may include a PLM module 113, a product database 116, and a display module 118. For example, the PLM module 113 enables a user (e.g., designer) to design, develop and maintain the product via a graphical user interface. The PLM module 113 includes a data sharing module 114 configured to share the product data with the target device 104 upon a request by the user. For example, the data sharing module 114 is configured to adaptively generate one or more payload files corresponding to the product data based on payload processing information received from the target device 104. The data sharing module 114 is configured to share the payload files to the target device 104 via the server 108 so that the product data is instantaneously reproduced at the target device 104. The product database 116 is configured to store the product data associated with the product. It may be noted that, the product database 116 may store the product data remotely such as in cloud storage and may be accessed via the network 106. The display module 118 is configured to display the graphical user interface for designing, developing and maintaining the product data. In some embodiments, the display module 118 is configured to display the product data that is intended to be shared with the target device 104.

The server 108 includes a payload repository 126 for storing the payload files generated by the source device 102 and ready for processing by the target device 104. The server 108 may be location a remote location from the source device 102 and the target device 104. The server 108 is accessible by the source device 102 and the target device 104 via the network 106.

The target device 104 includes a PLM module 119, a product database 122, and a display module 124. For example, the PLM module 119 enables a user (e.g., designer) to design, develop and maintain the product via a graphical user interface. The PLM module 119 includes a data rendering module 120. The data rendering module 120 is configured to process the payload files associated with the product data received from the target device 104. The data rendering module 120 is configured to reproduce at least part of the product data based on the processed payload files. The data rendering module 120 is also configured to compute payload processing information including but not limited to number of payload files waiting to be processed at the target device 104. Accordingly, the data rendering module 120 is configured to send the payload processing information to the source device 102 via the network. The product database 122 is configured to store the product data associated with the product. It may be noted that, the product database 116 may store the product data remotely such as in cloud storage and may be accessed via the network 106. The display module 124 is configured to display the graphical user interface for designing, developing and maintaining the product data. In some embodiments, the display module 124 is configured to display the product data reproduced using the payload files received from the source device 102.

Figure 8:
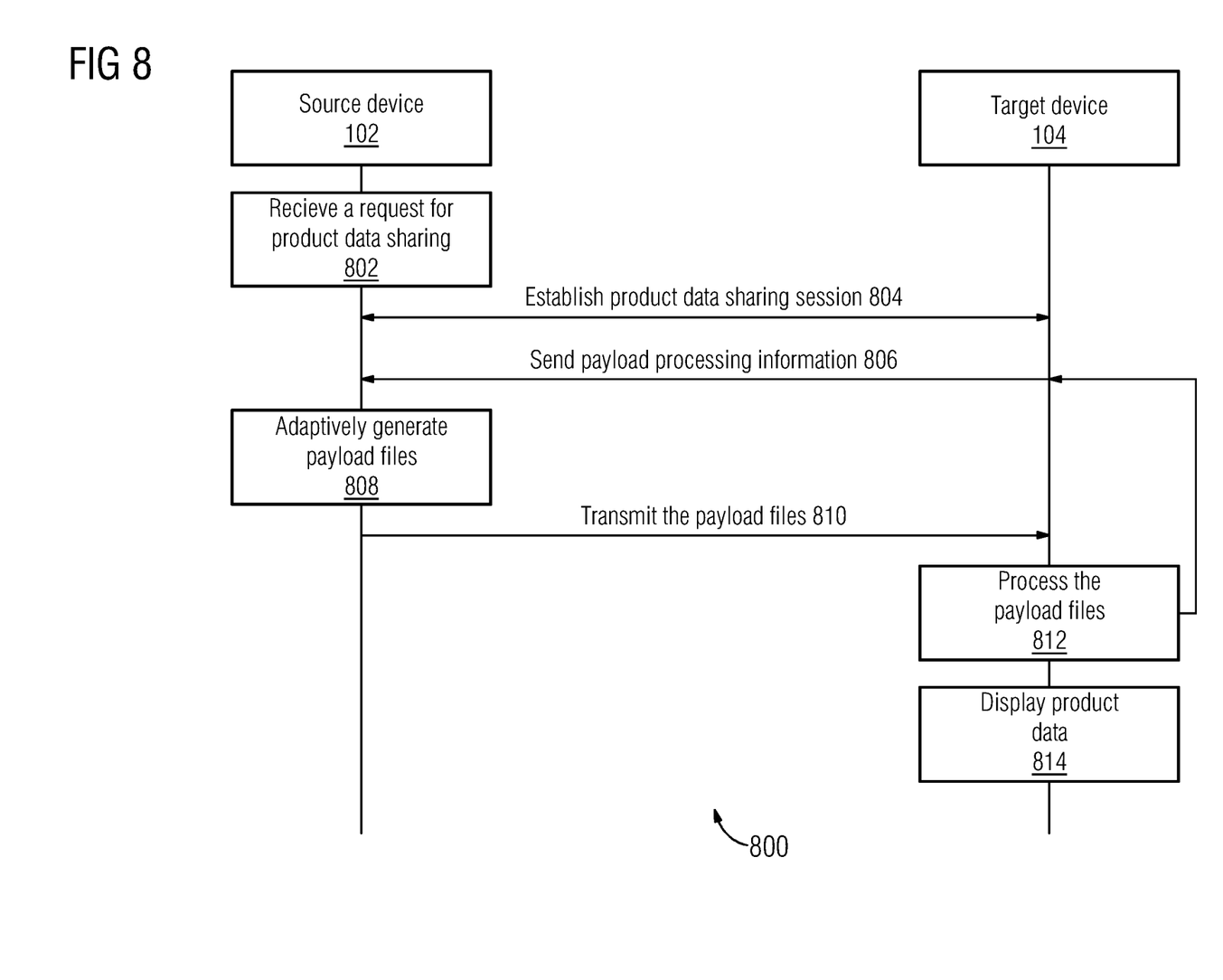
FIG. 8 is a flow diagram illustrating a process of sharing the product data in the collaborative environment, according to one embodiment.

A process 800 of sharing the product data in the collaborative environment 100 is illustrated in FIG. 8. Referring to FIG. 8, at act 802, the source device 102 receives a request for sharing the product data (e.g., computer aided design (CAD) model of a car) with the target device 104. For example, the product data may be currently displayed on the source device 102. At act 804, the source device 102 establishes a product data sharing session with the target device 104 based on the received request. At act 806, the target device 104 sends payload processing information to the source device 102. For example, the payload processing information may include number of payload files corresponding to the product data waiting to be processed at the target device 104. When the product data sharing session is established, the number of payload files waiting to be processed is zero as no payload files are yet transmitted by the source device 102.

At act 808, the source device 102 adaptively generates payload files corresponding to at least part of product data based on the payload processing information. For example, the source device 102 generates number of payload files sufficient to keep importer processes busy at the target device 104. At act 810, the source device 102 transmits the payload files to the target device 104. For example, as shown in FIG. 1, the source device 102 stores the payload files in the payload repository 126 in the server 108. The target device 104 downloads the payload files from the server 108. At act 812, the payload files are processed. Also, the target device 104 periodically sends payload processing information to the source device 102 until the payload files corresponding to the entire product data are processed. The payload processing information helps the source device 102 in determine unused payload processing capacity at the target device 104. At act 814, the product data corresponding to the payload files is reproduced and displayed on the target device 104.

Figure 2:
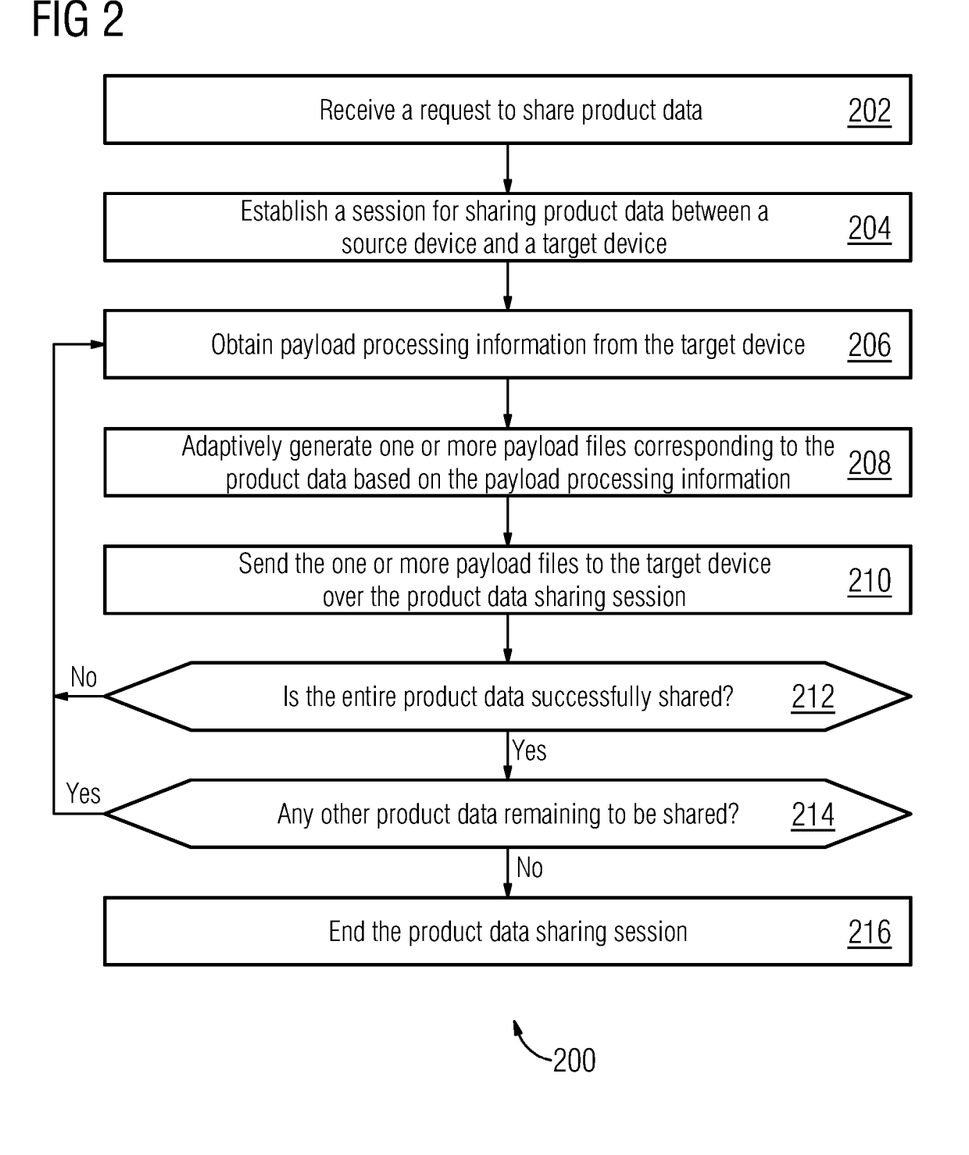
FIG. 2 is a process flowchart illustrating an exemplary method of a method of sharing product data in a collaborative environment, according to one embodiment.

FIG. 2 is a process flowchart 200 illustrating an exemplary method of a method of sharing product data in a collaborative environment, according to one embodiment. At act 202, a request to share product data associated with a product with the target device 104 is received from the source device 102. At act 204, a session for sharing the product data is established between the source device 102 and the target device 104. Also, the product data is obtained from the product database 116. At act 206, payload processing information is obtained from the target device 104 over the product data sharing session. For example, the source device 102 sends a request to share the payload processing information to the target device 104. The target device 104 sends the information including number of payload files waiting to be consumed at the target device 104 and total number of importer processes employed at the target device 104. The payload files are files associated with the product data. The payload files assist in reproducing the product data at the target device 104. Alternatively, the target device 104 periodically shares the payload processing information with the source device 102 after establishing the product data sharing session.

At act 208, one or more payload files corresponding to the product data are generated based on the payload processing information. The source device 104 generates one or more payload files if the target device 104 is capable of receiving and processing more payload files. If the payload processing information indicates that maximum number of payload files waiting to be processed at the target device 104, then the source device 102 defers generation of the payload files until receipt of next payload processing information. Also, size of the payload files generated at the source device 102 is dynamically adjusted based on number of payload files waiting to be processed at the target device 104. Thus, the source device 102 adaptively generates payload files associated with the product data. Advantageously, the target device 104 may process the received payload files while remaining payload files are being simultaneously generated at the source device 102. Consequently, the target device 104 need not wait until all payload files are generated and transmitted from the source device 102, and the source device 102 need not remain idle when the target device 104 processes the received payload files. As a result, product data may be shared in the collaborative environment in a quick manner.

At act 210, the generated payload files are sent to the target device 104 over the product data sharing session. At act 212, it is determined whether the entire product data is successfully sent to the target device 104. That is, the source device 102 determines whether the payload files corresponding to the product data are generated and sent to the target device 104 over the product data sharing session. If the product data is remaining to be sent to the target device 104, then the process 200 goes to act 202.

If the product data is successfully shared, then at act 214, it is determined whether any other product data is to be shared with the target device 104 during the product data sharing session. If any other product data is to be shared, then the process 200 is routed to act 206 and the acts 206 to 214 are repeated until the product data is successfully shared with the target device 104 during the existing product data sharing session. If no other product data is to be shared during the existing product data sharing session, then at act 216, the existing product data sharing session is terminated. The target device 104 processes the payload files corresponding to the product data and reproduces the product data on the display unit of the target device 104. Because the payload files are generated and sent continuously by the source device 102, the target device 104 reproduces the product data corresponding to the received payload files by processing the payload files. Advantageously, the product data displayed at the target device 104 is substantially same as the product data displayed at the source device 102.

Figure 3:
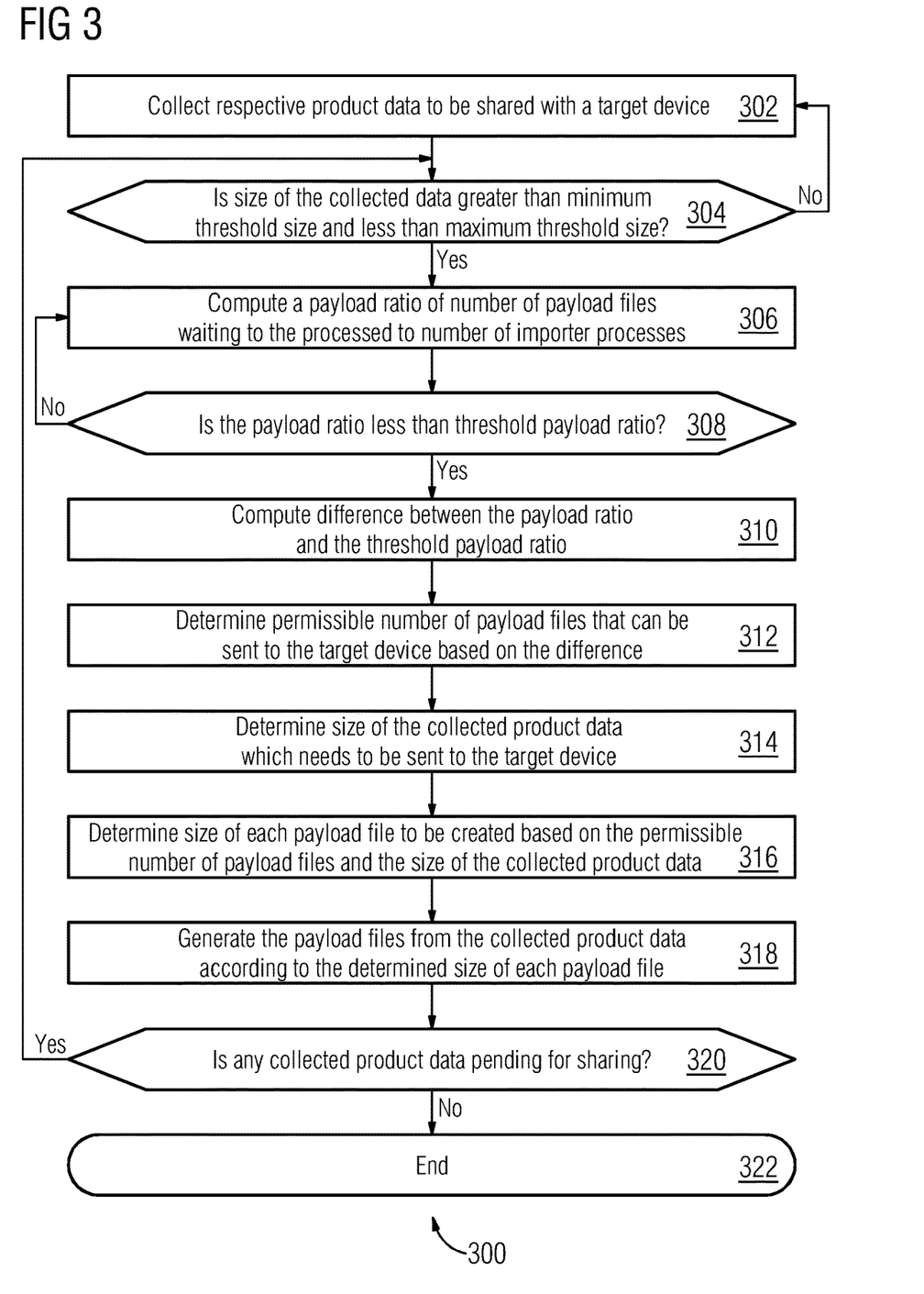
FIG. 3 is a process flowchart illustrating an exemplary method of a method of adaptively generating payload files at a source device based on payload processing information, according to one embodiment.

FIG. 3 is a process flowchart 300 illustrating an exemplary method of a method of adaptively generating payload files at the source device 102 based on payload processing information, according to one embodiment. At act 302, the product data to be shared with the target device 104 is collected during the product data sharing session. At act 304, it is determined whether size of the collected product data is greater than a minimum threshold size and less than a maximum threshold size. If the product data size is not greater than the minimum threshold size and not less than the maximum threshold size, then the process 300 goes to act 302. That is, the act of adaptive generation of payload files based on the collected product data is deferred until the product data size is greater than the minimum threshold size and less the maximum threshold size. If the product data size is greater than the minimum threshold size and not less than the maximum threshold size, at act 306, a payload ratio of the number of payload files waiting to be processed to the number of importer processes employed at the target device is computed.

At act 308, it is determined whether the payload ratio is less than a threshold payload ratio. The threshold payload ratio is a maximum number of payload files allowed to wait at the target device 104 to the number of importer processes employed at the target device 104. The threshold payload ratio is a positive real number pre-defined by the user. If the payload ratio is equal to or greater than the threshold payload ratio, then the process 300 is routed to act 306. If the payload ratio is less than the threshold payload ratio, then at act 310, difference between the payload ratio and the threshold payload ratio is computed. At act 312, number of payload files that may be sent to the target device 104 based on the difference between the payload ratio and the threshold payload ratio.

At act 314, size of the collected product data that needs to be sent to the target device 104 is determined. At act 316, size of each payload file to be created is determined based on the number of payload files and the size of the collected product data. It may be noted that the determined size of the payload files is within a minimum permissible payload size and a maximum permissible payload size. This provides that the source device 102 does not generate many small sized payload files and small number of large payload files, thereby improving performance of the entire collaboration environment 100. At act 318, the one or more payload files are generated from the collected product data according to the determined size of each payload file. At act 320, it is determined whether there are any payload files to be generated. If there are payload files to be generated, then the process 300 is routed act 304 and the acts 304 to 320 are repeated until all payload files for the product data to be shared are successfully generated. If all the payload files corresponding to the product data are successfully generated, the process 300 is ended.

Figure 4:
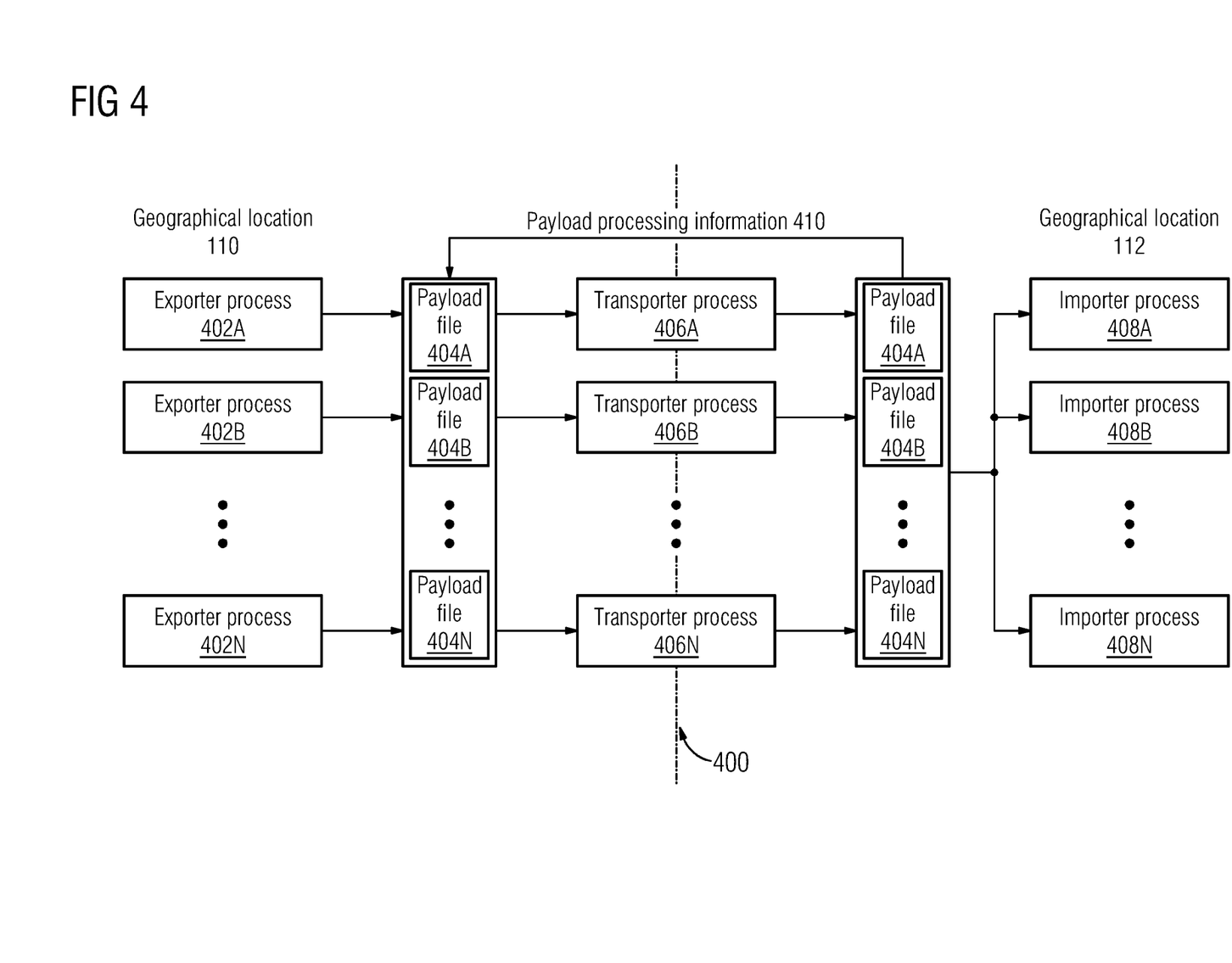
FIG. 4 is a schematic representation depicting a process of sharing of product data between the source device and a target device, according to one embodiment.

FIG. 4 is a schematic representation 400 depicting a process of sharing of product data between the source device 102 and the target device 104, according to one embodiment. As shown in FIG. 4, the source device 102 employs a plurality of exporter processes 402A-N for generating payload files 404 corresponding to the product data to be shared with the target device 104. Similarly, the target device 104 employs a plurality of importer processes for processing the payload files 404 received from the source device 102. A plurality of transporter processes 406A-N may be employed in the server 108 to transport the payload files 404 from the exporter processes 402A-N to the importer processes 408A-N.

Consider that the users of the source device 102 and the target device 104 are involved in designing and developing a vehicle (e.g., car) in a collaborative manner. The user of the source device 102 wishes to share a three-dimensional geometric model of the vehicle displayed in a graphical user interface of the source device 102 with the target device 104. Based on a request from the user of the source device 102, the source device 102 establishes a product data sharing session with the target device 104. The data sharing module 102 initiates multiple exporter processes 402A-N to generate payload files from vehicle data, that corresponds to the three dimensional geometric model. The data sharing module 102 distributes tasks of generating payload files from the vehicle data to the exporter processes 402A-N. The exporter processes 404A-N work in coordination with each other and distribute workload amongst each other throughout the product data sharing session.

For example, each of the exporter processes 402A-N identifies a task assigned to it by processing assigned principal root objects. Then, each of the exporter processes 402A-N traverses data associated with the principal root objects. Thereafter, each of the exporter processes 402A-N identifies principal root objects for adjoining island of data and stores the identified principal root objects for distribution amongst the exporter processes 402A-N. Island of data refers to logical and complete granular set of data. The vehicle data may be divided into multiple islands of data. Following traversal of principal root objects, the exporter processes 402A-N adaptively generates multiple payload files $404A_{1-N}$ to $404N_{1-N}$. The time for generating and transporting payload files depends on different strategies (as described in description of FIG. 3). In one embodiment, the exporter processes 402A-N generate payload files as needed such that the importer processes 408A-N remain busy throughout the product data sharing session. To achieve this, the exporter processes 402A-N determine number of payload files that may be generated and transported to keep the importer processes 408A-N busy and increasing size of the payload files if the importer processes 408A-N are busy based on payload processing information 410, that is periodically transmitted by the target device 104. The payload processing information 410 indicates the number of payload files received and pending to be processed by the importer processes 408A-N and total number of importer processes 408A-N employed during the product data sharing session at the target device 104.

The exporter processes 402A-N stores the payload files $404A_{1-N}$ to $404N_{1-N}$ in a staging area (e.g., payload repository 126). Each of the generated payload files $404A_{1-N}$ to $404N_{1-N}$ are transported from the geographical location 110 to the geographical location 112 via single or multiple steams of file exchanges. The payload files $404A_{1-N}$ to $404N_{1-N}$ are staged in a staging area at the target device 104. Accordingly, the importer processes 408A-N processes the received payload files $404A_{1-N}$ to $404N_{1-N}$. It may be noted that the importer processes 408A-N are not tightly coupled with the exporter processes 402A-N. This means that, any of the available importer processes 408A-N may process any of the payload files $404A_{1-N}$ to $404N_{1-N}$ irrespective of exporter process generated the payload file. The importer processes 408A-N processes the incoming payload files until product data is successfully shared. Accordingly, the three-dimensional model of the vehicle is reproduced on the graphical user interface of the target device 104. The three-dimensional model is partially displayed as and when corresponding payload files are processed by the importer processes 408A-N. The exporter processes 402A-N, the transporter processes 406A-N and the importer processes 408A-N operate independent of each other. The number of exporter processes 402A-N may be same or different than number of importer processes employed at the target device 104 and vice versa. Also, the number of transporter processes 406A-N may be same or different than the number of exporter processes 402A-N and the number of importer processes 408A-N.

It may be noted that, when the product data sharing session is established, the importer processes 408A-N are idle and new payload file(s) reaching the target device 104 is picked immediately by one of the importer processes. Therefore, the payload ratio would be negligible or zero. Accordingly, the exporter processes 402A-N generate more number of payload files of minimum size to make the importer processes busy. Once all the importer processes 408A-N has picked up the payload files and busy processing the same, new payload files would not be picked immediately. Hence, the payload ratio starts to increase. Once the payload ratio reaches the threshold ratio, the exporter processes 402A-N delays generation of new payload files, thereby increasing size of new payload files. Once the one or more importer processes 408A-N become free, the payload files waiting in the staging area are picked and processed. As a result, the payload ratio decreases. Consequently, the exporter processes 402A-N generates new payload files of lower size. The process continues until all the payload files are generated by the exporter processes 402A-N and processed by the importer processes 408A-N. In this manner, the payload files are adaptively generated by the exporter processes based on payload processing information 410 received from the target device 104.

Figure 5:
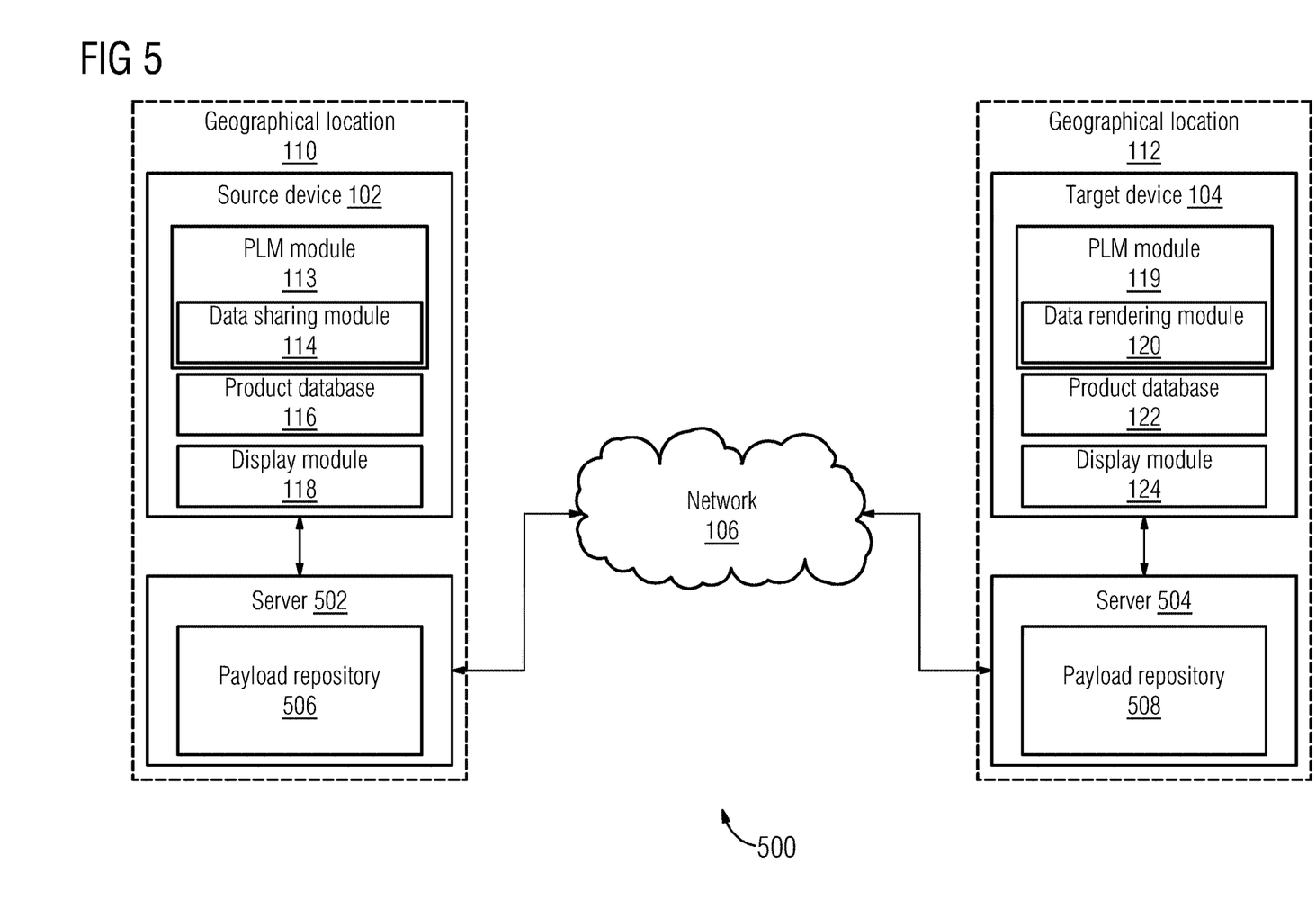
FIG. 5 is a schematic representation of a collaborative environment for developing a product, according to another embodiment.

FIG. 5 is a schematic representation of a collaborative environment 500 for developing a product, according to another embodiment. It may be seen that, the collaborative environment 500 is similar to the collaborative environment 100 of FIG. 1, except that the collaborative environment 500 does not include the server 108 remotely located from the source device 102 and the target device 104. In the collaborative environment 500, a server 502 and a server 504 are provided at the geographical location 110 and the geographical location 112 respectively. The server 502 is communicatively coupled to the source device 102 via local area network whereas the server 504 is communicatively coupled to the target device 104. The server 502 and the server 504 are connected via the network 106. The server 502 includes a payload repository 506 configured to store payload files generated by the source device 102. The server 502 transmits the payload files stored in the payload repository 506 to the server 504. The server 504 includes a payload repository 508 configured to store the payload files received from the server 502. The target device 104 processes the payload files stored in the payload repository 508 of the server 504 to reproduce the product data corresponding to the processed payload files. The reproduced product data may be substantially same as the product data displayed on the source device 102.

Similarly, the target device 104 periodically computes payload processing information indicating number of payload files waiting to be processed. The target device 104 may send the payload processing information to the source device 102 via the network 106. Alternatively, the target device 104 may send the payload processing information to the server 504. The server 504 sends the payload processing information to the server 502 is then forwarded to the source device 102.

Figure 6:
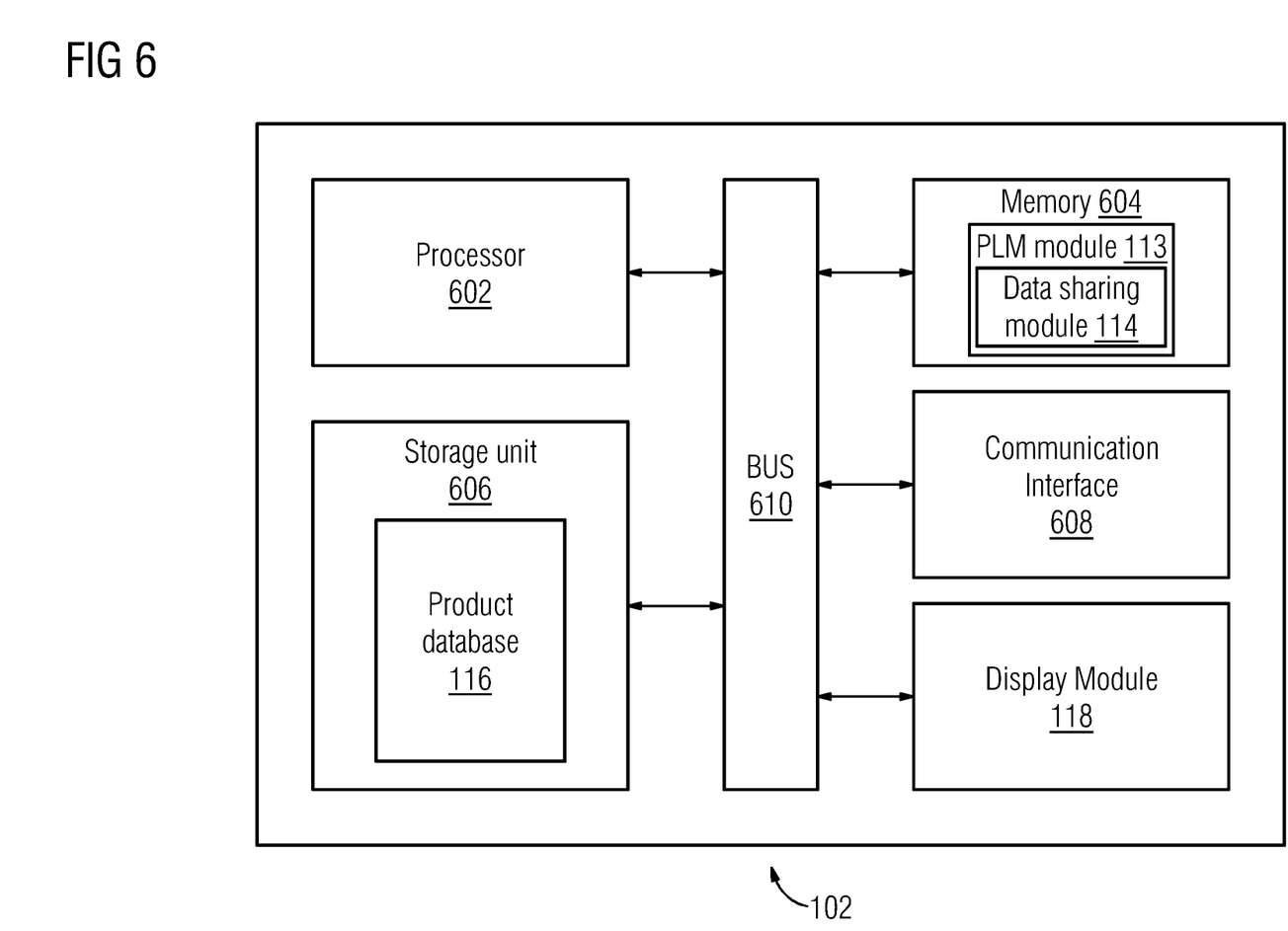
FIG. 6 is a block diagram of an exemplary source device capable of sharing product data with the target device, according to one embodiment.

FIG. 6 is a block diagram of an exemplary source device 102 capable of sharing product data with the target device 104, according to one embodiment. The source device 102 includes a processor 602, a memory 604, a storage unit 606, a communication interface 608, a bus 610, and the display module 118.

The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, and the like. The processor 602 may employ multiple exporter processes for adaptively generating payload files corresponding to product data to be shared with the target device 104.

The memory 604 may be non-transitory volatile memory and non-volatile memory. The memory 604 may be coupled for communication with the processor 602, such as being a computer-readable storage medium. The processor 602 may execute instructions and/or code stored in the memory 604. A variety of computer-readable instructions may be stored in and accessed from the memory 604. The memory 604 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. As depicted, the memory 604 includes the PLM module 113. The PLM module 113 is stored in the form of machine-readable instructions on any of the above-mentioned storage media and executable by the processor 602. The PLM module 113 includes the data sharing module 114 configured for sharing the product data associated with the product with the target device 104.

The storage unit 606 may be a non-transitory storage medium configured for storing the product database 116. The communication interface 608 may be an interface that enables the source device 102 to communicate with the target device 104 and the server 108 via the network 106. The bus 610 act as interconnect between the different components of the source device 102. The display module 118 may be an output unit for displaying the product data stored in the product database 116 on a graphical user interface of the PLM module 113.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition to or in place of the hardware depicted. The depicted example is provided for the purpose of explanation only and is not meant to imply architectural limitations with respect to the present disclosure.

A source device in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

Figure 7:
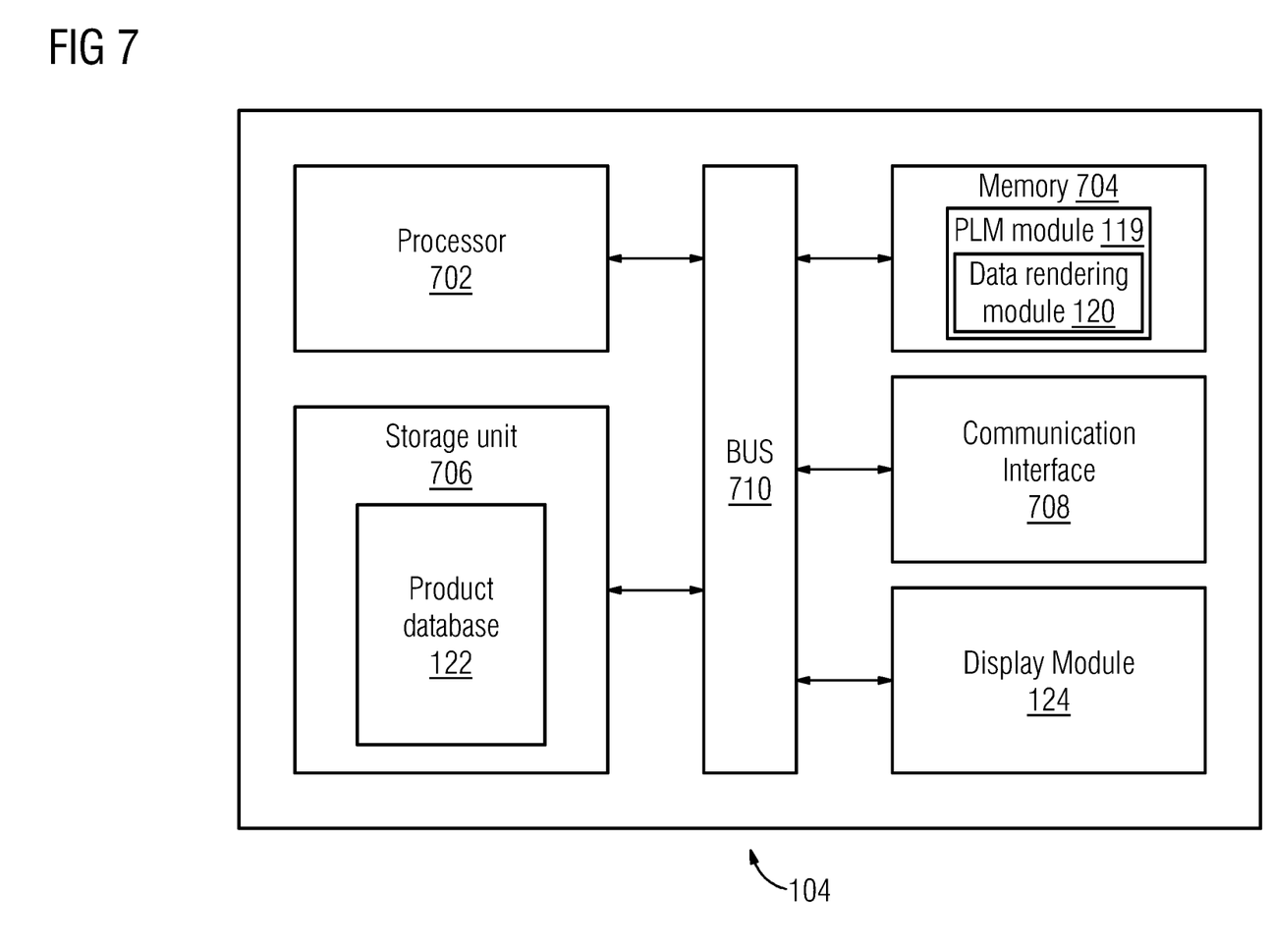
FIG. 7 is a block diagram of an exemplary target device capable of reproducing the product data shared by the source device, according to one embodiment.

FIG. 7 is a block diagram of an exemplary target device 104 capable of reproducing product data shared by the source device 102, according to one embodiment. The target device 104 includes a processor 702, a memory 704, a storage unit 706, a communication interface 708, a bus 710, and the display module 124.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, and the like. The processor 702 may employ multiple importer processes for processing payload files corresponding to product data received from the source device 102.

The memory 704 may be non-transitory volatile memory and non-volatile memory. The memory 704 may be coupled for communication with the processor 702, such as being a computer-readable storage medium. The processor 702 may execute instructions and/or code stored in the memory 704.

A variety of computer-readable instructions may be stored in and accessed from the memory 704. The memory 704 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. As depicted, the memory 704 includes the PLM module 119. The PLM module 119 is stored in the form of machine-readable instructions on any of the above-mentioned storage media and executable by the processor 702. The PLM module 119 includes the data rendering module 120 configured for reproducing the product data associated with the product based on the payload files received from the source device 102.

The storage unit 706 may be a non-transitory storage medium configured for storing the product database 116. The communication interface 708 may be an interface that enables the target device 104 to communicate with the source device 102 and the server 108 via the network 106. For example, the communication interface 708 enables the target device 104 to access the payload files shared by the source device 102. Also, the communication interface 708 enables the target device 104 to share payload processing information to the source device 102. The bus 710 act as interconnect between the different components of the source device 102. The display module 124 may be an output unit for displaying the product data reproduced from the product database 122 based on the payload files on a graphical user interface of the PLM module 119.

Those of ordinary skilled in the art will appreciate that the hardware depicted in FIG. 1 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition to or in place of the hardware depicted. The depicted example is provided for the purpose of explanation only and is not meant to imply architectural limitations with respect to the present disclosure.

A target device in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

In various embodiments, the methods and systems illustrated in FIGS. 1 to 8 provide sharing of product data by optimally using hardware resources at transmitting side (e.g., source device 102) and receiving side (e.g., target device 104) as well as throttling rate of transfer of payload files efficiently so that sharing of the product data may be scaled linearly. For example, this achieved by continuously determining whether there is any unused downstream capacity (e.g., importer processes are free) based on payload processing information 410 provided by the target device 104, and dynamically tuning upstream processes (e.g., exporter processes) such as determining whether to generate payload files to keep the idle importer processes busy, delay generation of payload files until a particular point, or generating less number of payload files of large size. This would result in keeping hardware resources busy performing their respective chores, e.g., exporter processes 402A-N are busy traversing more product data to serialize new payload files, transporter processes 406A-N are busy transporting the generated payload files from the source device 102 to the target device 104, and importer processes 408A-N are busy consuming the received payload files. Consequently, performance of the collaborative environment is significantly improved. Also, time consumed to design and develop the product in the collaborative environment is significantly reduced.

It is to be understood that the system and methods described herein may be implemented in various forms of hardware, software, firmware, special purpose processing units, or a combination thereof. One or more of the present embodiments may take a form of a computer program product including program modules accessible from computer-usable or computer-readable medium storing program code for use by or in connection with one or more computers, processing units, or instruction execution system. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation mediums in and of themselves as signal carriers are not included in the definition of physical computer-readable medium including a semiconductor or solid state memory, magnetic tape, a removable computer diskette, random access memory (RAM), a read only memory (ROM), a rigid magnetic disk, optical disk such as compact disk read-only memory (CD-ROM), compact disk read/write, and digital versatile disc (DVD) or any combination thereof. Both processing units and program code for implementing each aspect of the technology may be centralized or distributed (or a combination thereof) as known to those skilled in the art.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of sharing product data in a collaborative environment, the method comprising:
   establishing a session for sharing product data between a source device and a target device, wherein the source device comprises a plurality of exporter processes;
   collecting the respective product data to be transferred by each exporter process of the plurality of exporter processes;
   adaptively generating one or more payload files corresponding to the product data based on payload processing information, wherein the payload processing information comprises a plurality of payload files waiting to be processed at the target device; and
   sending the one or more payload files to the target device over the product data sharing session, wherein the product data is reproduced at the target device using the one or more payload files,
   wherein the adaptively generating of the one or more payload files comprises:
      determining whether a size of the collected product data is greater than a minimum threshold size and less than a maximum threshold size;
      computing a payload ratio of a number of payload files waiting to be processed to a number of importer processes employed at the target device when the determined size is greater than the minimum threshold size and less than the maximum threshold size;
      determining whether the payload ratio is less than a threshold payload ratio, wherein the threshold payload ratio is a maximum number of payload files allowed to wait at the target device to the number of importer processes employed at the target device;
      generating the one or more payload files based on a difference between the payload ratio and the threshold payload ratio when the determined payload ratio is less than the threshold payload ratio; and
      deferring the generation of the one or more payload files based on the collected product data when the determined payload ratio is not less than the threshold payload ratio.

2. The method of claim 1, further comprising:
   periodically obtaining the payload processing information from the target device during the product data sharing session.

3. The method of claim 1, wherein the target device comprises a plurality of importer processes.

4. The method of claim 1, wherein the adaptively generating of the one or more payload files corresponding to the product data further comprises:
   periodically repeating the determining of whether the size of the collected product data is greater than the minimum threshold size and less than the maximum threshold size, the computing of the payload ratio, the determining of whether the payload ratio is less than the threshold payload ratio, the generating of the one or more payload files, and the deferring of the generation of the one or more payload files until sharing of the product data is complete.

5. The method of claim 1, wherein the adaptively generating of the one or more payload files based on the difference between the payload ratio and the threshold payload ratio comprises:
   computing a difference between the payload ratio and the threshold payload ratio;
   determining a number of payload files configured to be sent to the target device based on the difference between the payload ratio and the threshold payload ratio;
   determining a size of the collected product data that needs to be sent to the target device;
   determining a size of each payload file to be created based on the number of payload files and the size of the collected product data; and
   generating the payload files from the collected product data according to the determined size of each payload file.

6. The method of claim 5, wherein the determined size of the payload files is within a minimum permissible payload size and a maximum permissible payload size.

7. The method of claim 1, wherein the plurality of exporter processes process the collected product data in coordination with each other.

8. A data processing system comprising:
   at least one processing unit employing a plurality of export processes;
   a memory unit coupled to the at least one processing unit, wherein the memory unit comprises a data sharing module stored in a form of machine-readable instructions and executable by the processing unit, wherein the data sharing module is configured to:
      establish a session for sharing product data with a target device;
      collect the respective product data to be transferred by each exporter process of the plurality of exporter processes;
      adaptively generate one or more payload files corresponding to the product data based on payload processing information, wherein the payload processing information comprises a plurality of payload files waiting to be processed at the target device in the product data sharing session; and
      send the one or more payload files to the target device over the product data sharing session, wherein the product data is reproduced at the target device using the one or more payload files,
      wherein, in the adaptive generation of the one or more payload files corresponding to the product data, the data sharing module is configured to:
         determine whether a size of the collected product data is greater than a minimum threshold size and less than a maximum threshold size;
         compute a payload ratio of a number of payload files waiting to be processed to a number of importer processes employed at the target device when the determined size is greater than the minimum threshold size and less than the maximum threshold size;
         determine whether the payload ratio is less than a threshold payload ratio, wherein the threshold payload ratio is a maximum number of payload files allowed to wait at the target device to the number of importer processes employed at the target device; generate the one or more payload files based on a difference between the payload ratio and the threshold payload ratio when the determined payload ratio is less than the threshold payload ratio; and defer the generation of the one or more payload files based on the collected product data when the determined payload ratio is not less than the threshold payload ratio.

9. The data processing system of claim 8, wherein the data sharing module is configured to:
periodically obtain the payload processing information from the target device during the product data sharing session.

10. The data processing system of claim 8, wherein, in the adaptively generation of the one or more payload files corresponding to the product data, the data sharing module is further configured to:
periodically repeat the determining of whether the size of the collected product data is greater than the minimum threshold size and less than the maximum threshold size, the computing of the payload ratio, the determining whether the payload ratio is less than the threshold payload ratio, the generating of the one or more payload files, and the deferring of the generation of the one or more payload files until the sharing of the product data is complete.

11. The data processing system of claim 8, wherein, in the generation of the one or more payload files based on the difference between the payload ratio and the threshold payload ratio, the data sharing module is configured to:
compute a difference between the payload ratio and the threshold payload ratio;
determine a number of payload files configured to be sent to the target device based on the difference between the payload ratio and the threshold payload ratio;
determine a size of the collected product data that needs to be sent to the target device;
determine a size of each payload file to be created based on the number of payload files and the size of the collected product data; and
generate the payload files from the collected product data according to the determined size of each payload file.

12. The data processing system of claim 11, wherein the determined size of the payload files is within a minimum permissible payload size and a maximum permissible payload size.

13. The data processing system of claim 12, wherein the plurality of exporter processes process the collected product data in coordination with each other.

14. A non-transitory computer-readable storage medium having instructions stored therein, that when executed by a data processing system, cause the data processing system to:
establish a session for sharing product data with a target device;
collect the respective product data to be transferred by each exporter process of a plurality of exporter processes;
adaptively generate one or more payload files corresponding to the product data based on payload processing information, wherein the payload processing information comprises a plurality of payload files waiting to be processed at the target device in the product data sharing session; and
send the one or more payload files to the target device over the product data sharing session, wherein the product data is reproduced at the target device using the one or more payload files,
wherein, in the adaptive generation of the one or more payload files corresponding to the product data, the data processing system is configured to:
determine whether a size of the collected product data is greater than a minimum threshold size and less than a maximum threshold size;
compute a payload ratio of a number of payload files waiting to be processed to a number of importer processes employed at the target device when the determined size is greater than the minimum threshold size and less than the maximum threshold size;
determine whether the payload ratio is less than a threshold payload ratio, wherein the threshold payload ratio is a maximum number of payload files allowed to wait at the target device to the number of importer processes employed at the target device;
generate the one or more payload files based on a difference between the payload ratio and the threshold payload ratio when the determined payload ratio is less than the threshold payload ratio; and
defer the generation of payload files based on the collected product data when the determined payload ratio is not less than the threshold payload ratio.

15. The storage medium of claim 14, wherein, in the adaptive generation of the one or more payload files corresponding to the product data, the data processing system is configured to:
periodically repeat the determining of whether the size of the collected product data is greater than the minimum threshold size and less than the maximum threshold size, the computing of the payload ratio, the determining whether the payload ratio is less than the threshold payload ratio, the generating of the one or more payload files, and the deferring of the generation of the one or more payload files until the sharing of the product data is complete.

16. The storage medium of claim 14, wherein, in the generation of the one or more payload files based on the difference between the payload ratio and the threshold payload ratio, the data processing system is configured to:
compute a difference between the payload ratio and the threshold payload ratio;
determine a number of payload files configured to be sent to the target device based on the difference between the payload ratio and the threshold payload ratio;
determine a size of the collected product data that needs to be sent to the target device;
determine a size of each payload file to be created based on the number of payload files and the size of the collected product data; and
generate the payload files from the collected product data according to the determined size of each payload file.

17. The storage medium of claim 16, wherein the determined size of the payload files is within a minimum permissible payload size and a maximum permissible payload size.

* * * * *